Jan. 6, 1953     A. W. JOHNSON     2,624,271
FRUIT JUICER
Filed Dec. 27, 1950     6 Sheets—Sheet 1
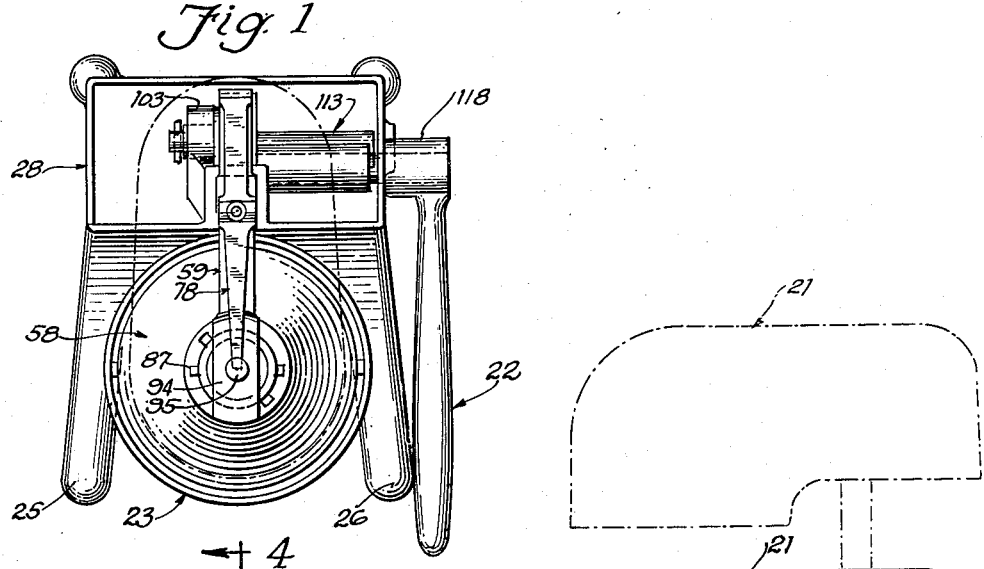
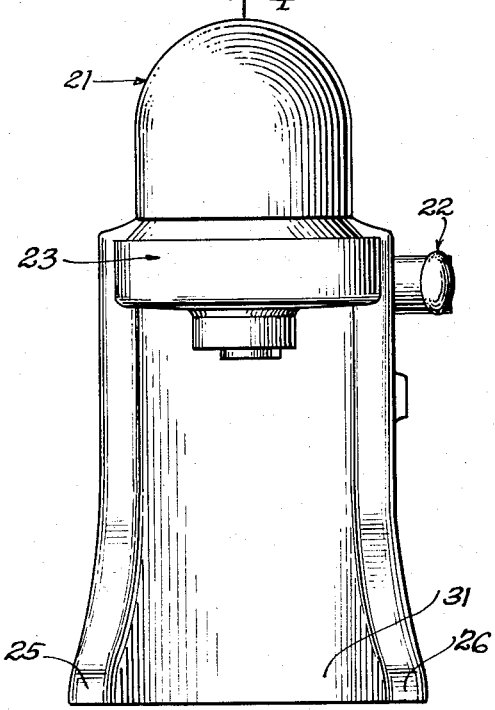
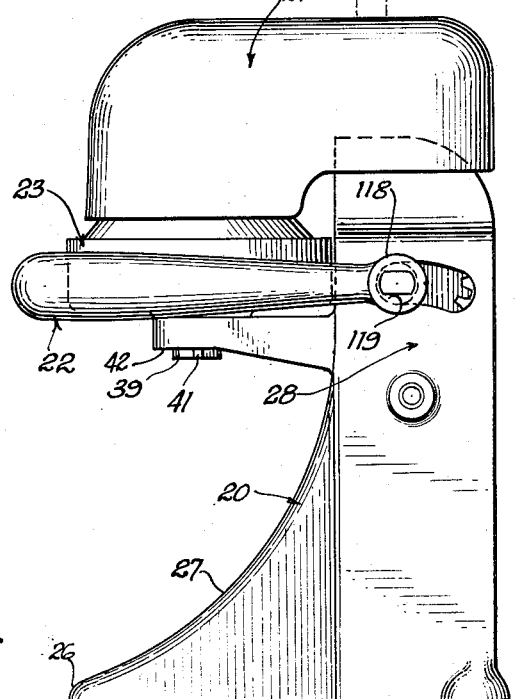
INVENTOR.
Alfred W. Johnson
BY Robert H. Wendt
Attorney Jan. 6, 1953  A. W. JOHNSON  2,624,271
FRUIT JUICER
Filed Dec. 27, 1950  6 Sheets-Sheet 2

INVENTOR.
Alfred W. Johnson
BY Robert H. Wendt
Attorney

Jan. 6, 1953      A. W. JOHNSON      2,624,271
FRUIT JUICER
Filed Dec. 27, 1950      6 Sheets-Sheet 3
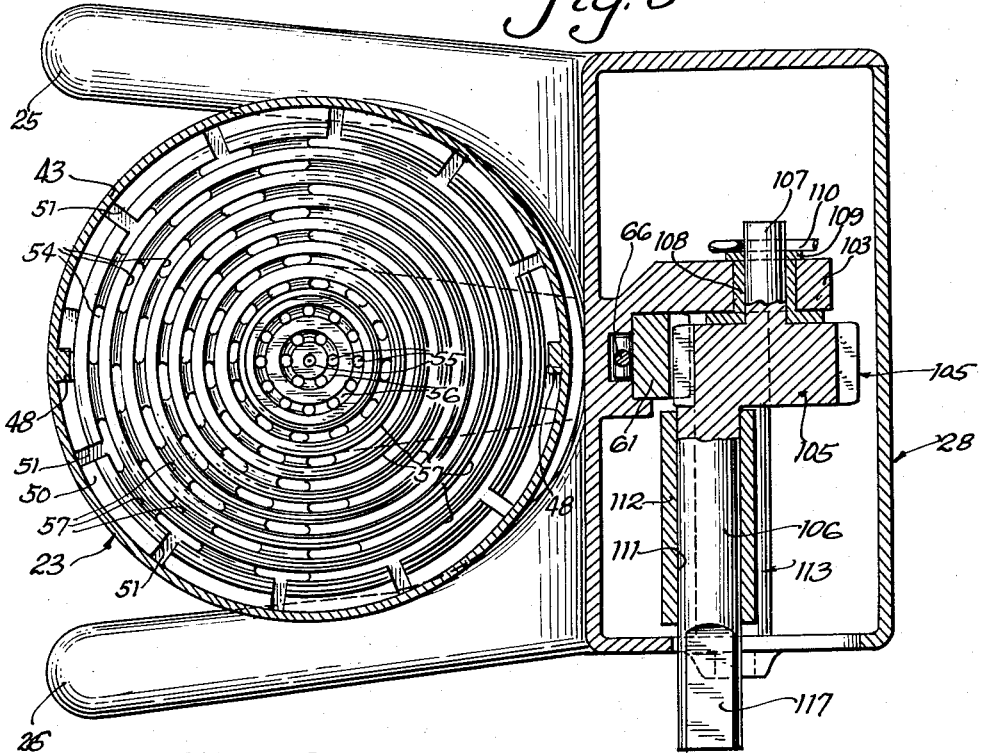
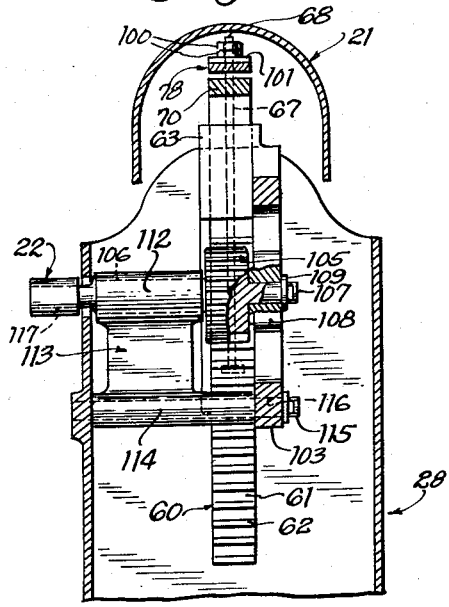
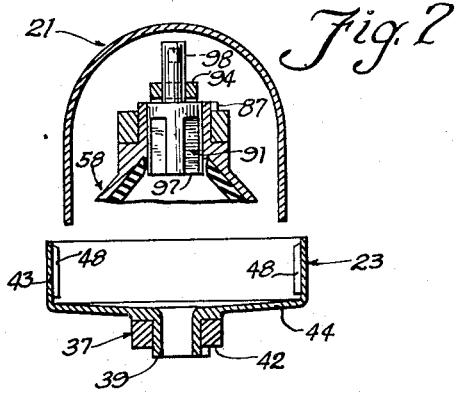
INVENTOR.
Alfred W. Johnson
BY Robert H. Wendt
Attorney Jan. 6, 1953  A. W. JOHNSON  2,624,271
FRUIT JUICER Filed Dec. 27, 1950  6 Sheets-Sheet 4

INVENTOR.
Alfred W. Johnson
BY Robert H. Wendt
Attorney

Jan. 6, 1953            A. W. JOHNSON            2,624,271

FRUIT JUICER

Filed Dec. 27, 1950            6 Sheets-Sheet 5

Position A      Position B      Position C

INVENTOR.
Alfred W. Johnson
BY Robert H. Wendt
Attorney

Jan. 6, 1953  A. W. JOHNSON  2,624,271
FRUIT JUICER
Filed Dec. 27, 1950  6 Sheets-Sheet 6

INVENTOR.
Alfred W. Johnson
BY Robert H. Wendt
Attorney

Patented Jan. 6, 1953

2,624,271

UNITED STATES PATENT OFFICE 2,624,271

FRUIT JUICER

Alfred W. Johnson, Chicago, Ill.

Application December 27, 1950, Serial No. 202,935

4 Claims. (Cl. 100—213)

The present invention relates to fruit juicers, and is particularly concerned with that type of fruit juicer which is generally used for citrus fruits for squeezing the juice out of the fruit after it has been cut in half.

In the fruit juicers of the prior art of the type employing a ring and pinion it is necessary for the operator to spend a certain amount of time in twirling the handle of the pinion shaft in order to bring the pressure cup down into engagement with the fruit, after which he places pressure upon it; and again the handle must be turned a number of times in such prior art devices to separate the pressure cup of the juicer from the rind.

One of the objects of the invention is the provision of an improved fruit juicer having an improved actuating mechanism by means of which the handle is adapted to effect a maximum amount of motion of the pressure cup to bring the cup into engagement with the fruit, and thereafter to exert a maximum amount of force with a minimum amount of movement by means of the same handle, with the handle in the most convenient position for exerting force upon it.

Another object of the invention is the provision of an improved fruit juicer mechanism of the class described, which is also provided with means for ejecting the rind from the pressure cup at or adjacent the upper limit of its stroke.

Another object of the invention is the provision of an improved construction and mechanism for fruit juicers or the like by means of which the juicer may be operated more swiftly and with a minimum number of movements on the part of the operator, while still exerting a maximum pressure to extract the juice from the fruit and to remove the previously squeezed rind from the pressure cup.

Another object is the provision of an improved fruit juicer construction which is simple, sturdy, capable of economical manufacture, efficient, and adapted to be used for a long period of time without necessity for repair or replacement of any of its parts.

Other objects and advantages of the invention will be apparent from the following description and the accompanying drawings, in which similar characters of reference indicate similar parts throughout the several views.

Referring to the six sheets of drawings accompanying this specification,

Fig. 1 is a top plan view of a fruit juicer embodying my invention;

Fig. 2 is a front elevational view;

Fig. 3 is a side elevational view;

Fig. 5 is a horizontal sectional view, taken on the plane of the line 5—5 of Fig. 4, looking in the direction of the arrows;

Fig. 6 is a fragmentary sectional view, taken on the plane of the line 6—6 of Fig. 4, looking in the direction of the arrows;

Fig. 7 is a fragmentary sectional view, taken on the plane of the line 7—7 of Fig. 4, looking in the direction of the arrows;

Figure 4:
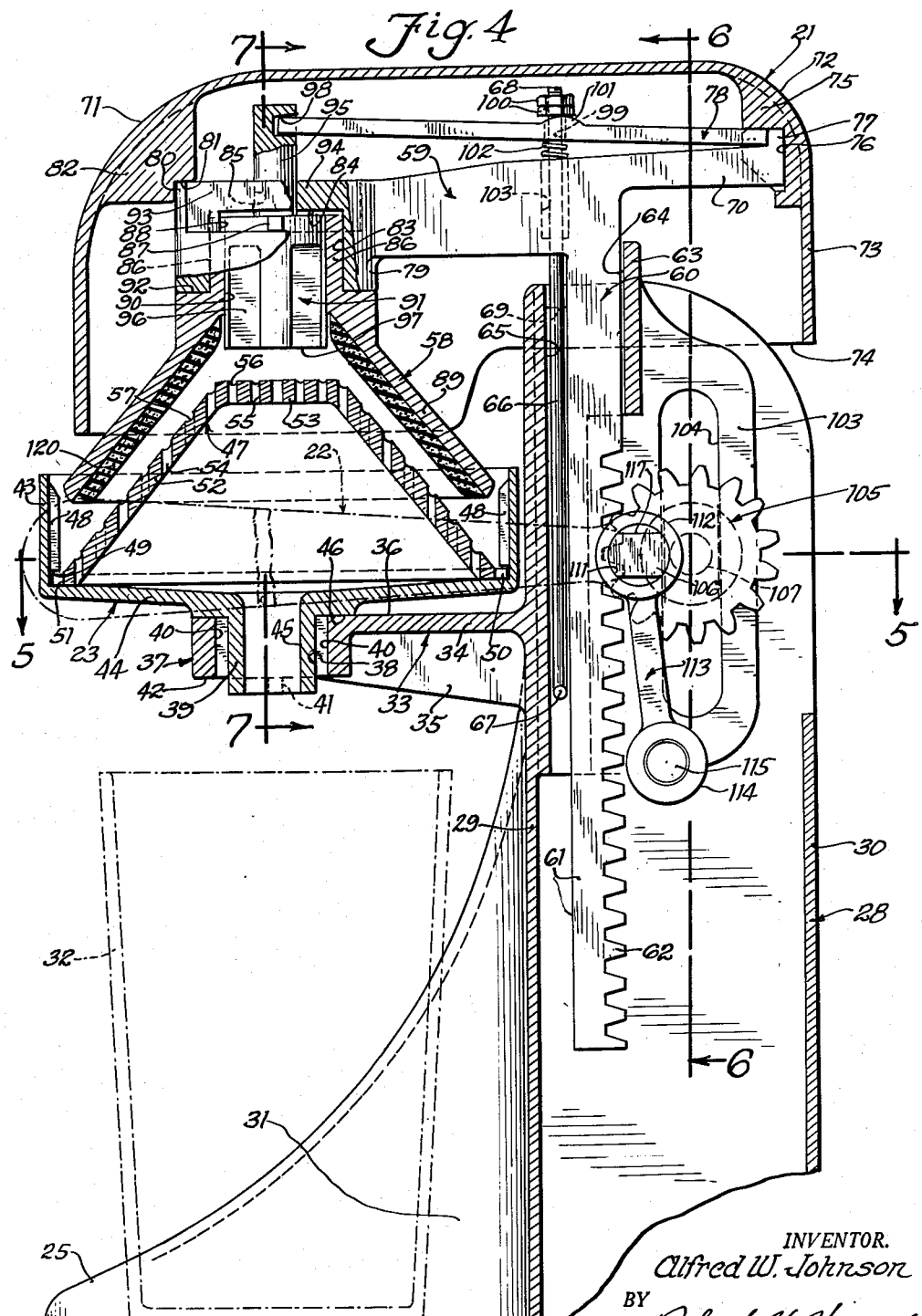
Fig. 4 is a sectional view, taken on the plane of the line 4—4 of Fig. 2, looking in the direction of the arrows.
Figure 8:
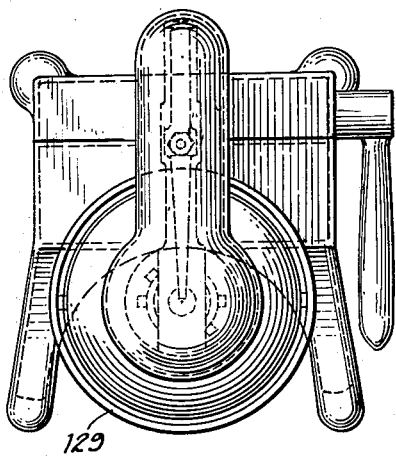
Fig. 8 is a top plan view of a modified form of construction.
Figure 9:
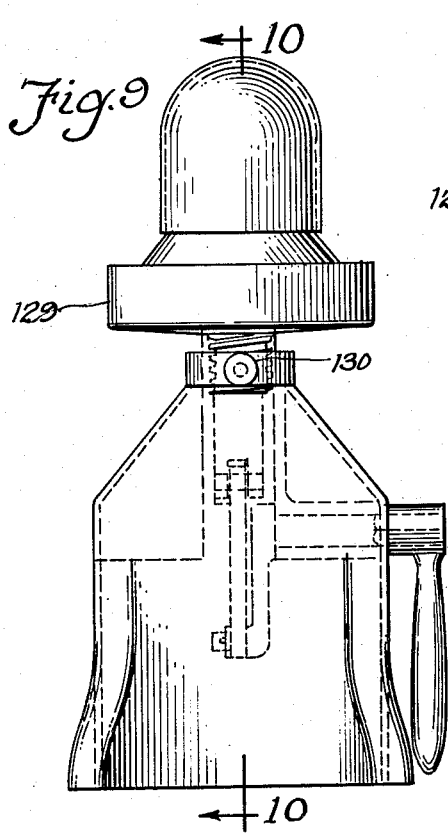
Fig. 9 is a front elevational view of the juicer of Fig. 8.

Referring to Figs. 1 to 3, the present fruit juicer preferably includes a supporting base 20, a top cover 21, an actuating handle 22, and a juice collecting receptacle 23. The base 20 is provided with a lower plane surface 24 and is preferably in the form of a U-shaped member at the surface 24, having the forwardly extending tapered side flanges 25, 26, the forward edges of which have a concave curvature at 27, joining with the upwardly extending column 28.

The column 28 may be hollow, as shown in Fig. 4, and provided with a front wall 29 and a back wall 30. The forwardly extending flanges 25, 26 may be spaced sufficiently to provide a U-shaped space 31, between which a tumbler 32 may be conveniently located to receive the juice from the juice collector 23.

Immediately above the top of the tumbler 32 the front wall 29 of the column 28 is preferably provided with a cantilever supporting arm 33, comprising a horizontal flange 34 and a vertical reinforcing rib 35, extending forwardly from the column wall 29.

The horizontal flange 34 may have an upper plane surface 36 and may terminate in a vertically open ring 37, having a through bore 38 adapted to receive the discharge tube 39 of the juice collector 23. The bore 38 is circular, but may have a pair of radially extending rectangular slots 40 for passing a rectangular lug 41 carried by the juice collector tube 39 and adapted to hold the juice collector on the arm 33.

The juice collector has its tube 39 passed through the bore 38 with the lug 41 passing down one of the slots 40, after which the juice collector is rotated until its lug 41 engages the lower flat surface 42 of the ring 37, thus retaining the juice collector on the column.

The juice collector 23 may consist of a cast metal cylindrical cup having a cylindrical side wall 43 and a slightly frusto-conical bottom wall 44 draining toward the bore 45 in the discharge tube 39. The bottom has a plane seating surface 46 for engaging the top of the arm 33 at the ring 37.

For the purpose of holding the juicer cone 47 in juice collector 23 the inner surface of cylindrical wall 43 may have one or more longitudinal ribs 48, which terminate short of the bottom 44, leaving a slot at 49 below each rib. The juicer cone 47 preferably has a radially extending flange 50 at its lower end, the flange 50 being provided with slots 51 for passing the ribs 48.

Thus the cone 47 may be secured in the juice collector 23 by sliding the slots 51 over the ribs 48, and thereafter turning the flange 50 under the ends of the ribs 48. The juicer cone 47 preferably consists of a cast metal member of frusto-conical shape, having a conical side wall 52 and a flat top wall 53.

Both of these walls 52, 53 are provided with a multiplicity of vertically extending apertures 54 in the side wall and 55 in the top wall. The top wall apertures 55 are preferably circular, as seen in Fig. 5; but they are also preferably arranged in circles about the center of the cone, and are preferably joined by annular grooves 56, which permit the juice to run from one hole to another, discharging from such holes as may not be bridged by pulp or parts of pulp.

The vertical holes 54 in the side wall 52 are preferably oval, as seen in Fig. 5, and staggered as to location, the oval holes being located according to concentric circular lines, and increasing in length as they are located toward the periphery or bottom of the cone.

These vertical oval holes 54 are also preferably joined by vertical annular grooves 57, which permit the juice to run from one hole to another and to discharge from those holes which are conveniently open and free from pulp.

The pressure cup 58 is carried by a forwardly projecting arm 59 on a vertical rack 60. The rack 60 is preferably rectangular in cross section, having three flat sides 61 and the teeth 62 upon its rear side.

The column 28 has its front wall 29 provided with an integral tubular guide 63 at the upper part of the column, this guide having a rectangular bore 64 which is complementary to the rack 60.

The forward wall of this guide bore 64 has a grooved extension, indicated at 65, which is rectangular in shape, and which provides space for a sliding stop wire or rod 66, for a purpose further to be described. The wire 66 has a laterally bent end portion 67 at its lower end and has a threaded part 68 at its upper end.

The guide groove 65 terminates at the top of the standard 28, leaving only a small aperture for the wire 66, and having inwardly extending shoulders 69 at the upper end of the standard for engaging the laterally turned end 67 on the wire 66, when the rack travels up to this point, for a purpose further to be described. Besides the tubular portion 64 of the guide for rack 60, the column 28 is formed below the tubular portion 63 with three of the walls of the guide 64 engaging and guiding the rack.

At its upper end the rack 60 not only has the forwardly extending arm 59, but also the rearwardly extending arm 70. These two arms support a top cover, indicated at 21; and this top cover may consist of an inverted, elongated cast metal member with rounded corner portions 71, 72, a depending side wall 73, and a bottom opening 74. The size and shape of the side wall 73 is such that it is adapted to embrace the other parts of the juicer without interference in the downward movement of the rack 60 to a position of practically full engagement between the pressure cup 58 and the juicer cone 47.

The top cover adds to the appearance of the assembly and tends to keep dirt and foreign material off all of the parts which it covers. It may be supported in place by providing the side wall 73 with an inwardly extending portion 75 near the upper corner 72.

This thickened portion of the wall has a rectangular socket 76 for receiving the complementary end 77 of the rearwardly extending arm 70. The arm 70 is deeper from top to bottom at its right end, but is made narrower inside the left part of the lever 78, which is a part of the ejector mechanism for the rinds.

The lever 78 has a loose fit in its part of the socket 77 so that it has a limited pivotal movement, but is held against horizontal lateral movement.

At its forward end the arm 59 has a substantially cylindrical enlargement 79, the forward upper corner 80 of which is adapted to fit in a complementary downwardly open angular socket 81 in the wall of the cover 21 at the thickened portion 82. The cover socket 81 may have a frictional fit on the end portion 80 of arm 59; and thus the cover is carried by the rack and its arms.

The cylindrical member 79 on arm 59 has a bore 83 which terminates at a flat bearing surface 84 and communicates with a smaller counterbore 85.

The bore 83 is adapted to receive the cylindrical shank 86 of the pressure cup 58, which fits in this bore and is retained in place by a laterally projecting lug 87. The bore 83 is cylindrical, but it has a longitudinal groove for passing the lug 87 on the shank 86; and there is an annular groove 88 at the upper end of bore 83, into which the lug 87 may be rotated to hold the pressure cup 58 on the arm 59.

The pressure cup 58 consists of a substantially frusto-conical wall 89, which has the same angularity as that of the cone 47. 120 indicates a lining of porous rubber of conical shape on the inside of the pressure cup 58 for gripping the rind of the citrus fruit and lifting it from the cone 47 after the juice has been extracted.

At its upper end the pressure cup 58 is provided with the tubular shank 86, having a cylindrical bore 90 for guiding an ejector body 91. The upper end of the cone 89 is enlarged and provided with an angular seat 92 for engaging a complementary plane seating surface on the body of the head 79. The head 79 may have its upper parts flatted, as indicated at 93, to save material; and its upper wall 94 is provided with the bore 85, previously mentioned.

The bore 85 slidably receives the cylindrical shank 95 of the ejector 91. The ejector 91 is substantially cylindrical, but may be provided with the flatted sides 96. Its lower end 97 may be plane. The lever 78 of the ejector mechanism has its left end in Fig. 4 in a rectangular socket 98 in the shank 95 of the ejector. At a point intermediate its ends it is provided with a through bore 99 for passing the rod 66, which carries a pair of nuts 100 at its upper end.

The lever 78 may have upwardly curved side flanges 101 for engagement with the nuts. A coil spring 102 may be carried by wire 66 below the lever 78 and may be located in the counterbore 103. This gives the coil spring 102 greater length and greater expansive power. The spring 102 urges the ejector lever 78 upward, which in turn pulls the ejector 91 upward into the position which it has in Fig. 4.

The column 28 has its front wall 29 also provided with the guide flange 103, which is provided with a shaft slot 104.

The rack 60 is driven by means of a pinion 105, which has an integral laterally extending actuating shaft 106; and upon its other side it has a guide shaft 107. The guide shaft 107 may be provided with a bearing bushing 108, a washer 109, and a cotter pin 110.

The guide shaft 107 is concentric with respect to the pinion 105, but the actuating shaft 106 is eccentrically located toward one side of the pinion adjacent the teeth of pinion 105. The actuating shaft 106 has an elongated cylindrical bearing surface 111, which is mounted in the tubular bearing 112 carried by a pivoted link 113.

The pivoted link 113 is in the form of a wide web, carrying the upper bearing 112 and a smaller lower bearing 114, which is provided with a shaft 115 that is pivotally mounted in a bearing aperture 116 in the column flange 103. The end of the actuating shaft 106 may be flatted, as shown at 117; and it projects from the wall of the column through a horizontally extending arcuate slot 118 (Fig. 3).

The necessity for the arcuate slot is brought about by the fact that the position of the shaft 106 is determined by the pivoted link 113 and the other gear elements. The actuating shaft end 117 is provided with an elongated handle 22, having a hub 118, which is provided with an aperture 119 complementary to the flatted end 117 of shaft 106.

Thus the handle 22 is fixedly secured to the shaft 106, with which it rotates; and shaft 106 is fixedly secured to gear 105, which actuates the rack 60.

The supporting flange 103 of column 28 has a vertical slot 104 in which the shaft 107 and its bearing 108 may slide.

The operation of the present juicer is as follows: The handle, gear, and rack are so arranged that when the handle 22 is horizontal, as indicated in Fig. 3, the pressure cup 58 is at its lowermost position, compressing the citrous fruit. In this horizontal position the handle 22 is adapted to be used to exert a maximum force or torque on the shaft 106 because the operator can push harder downwardly than he can in any other direction.

Figure 11:
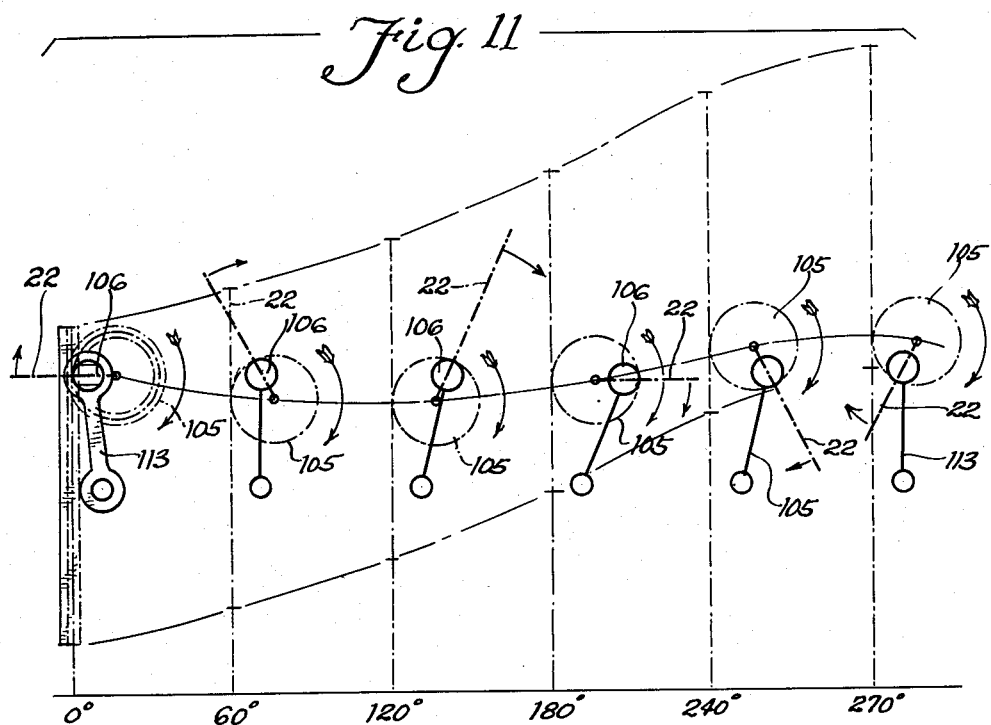
Fig. 11 is a movement diagram showing the positions of the crank or handle and the corresponding amount of movement produced in the pressure cup at any point in the rotation of the handle.

Referring to Fig. 11, this is a diagrammatic illustration, in which the handle is shown in six different positions, corresponding to sixty degree intervals. The zero degree position is that of Fig. 3. As the operator lifts the handle 22 with one hand, it passes from the zero degree position to the sixty degree position of Fig. 11; and the handle is in each case indicated by the numeral 22 applied to a dash line.

The handle being integrally attached to the shaft 106 and to gear 105, it tends to rotate the gear 105; but this pinion is integrally attached to eccentric shaft 106, which is held down by the link 113. The shaft 106 cannot rise; and therefore pinion 105 must move downward as it rotates, and this is shown by the sixty degree position.

The rotation of the pinion, however, tends to move the rack upward; but the net amount of motion of the rack is the difference between the downward movement of the pinion and the movement of the rack relative to the pinion.

In the next 60 degree rotation of handle 22 the shaft 106 moves to the rear slightly in the slot 118 (Fig. 3); and the shaft 106 is now in a position in which the vertical elevation of gear 105 does not change much. During this motion, however, the rack is again lifted a predetermined amount by the pinion 105.

During the next sixty degree rotation to the one hundred and eighty degree position the handle 22 moves over to the rearward horizontal position; and as the shaft 106 approaches this position the gear 105 is elevated at its axis; and it also elevates the rack by an amount which is determined by sixty degrees rotation of the pinion.

During this increment of movement the movement of the juicer head is the additive sum of that caused by the pinion acting on the rack and that caused by the elevation of the pinion itself rotating on the eccentric axis 106.

During the next increment of movement to the two hundred and forty-five position of the handle, the handle 22 moves to a depending position; and the gear or pinion 105 is further elevated, also causing the rack to rise another increment.

During this increment of motion the elevating effects which are caused by the gear actuating the rack, and by the gear itself being elevated, are additive. This is a phase during which maximum motion of the juicer head is produced with a minimum motion of the handle.

During the next increment of sixty degrees angular motion of the handle the handle comes to the two hundred and seventy degree position; and during this motion the shaft 106 tends to rise toward the left of the slot 118 of the column, while the gear or pinion 105 tilts over toward the right of shaft 106; and the link 113 assumes a substantially vertical position.

During this movement the pinion acting on the rack raises the juicer head; but the elevation of the pinion itself is not changed much. During the reverse movement of the handle 22 the juicer head is brought down at a varying rate of speed, which is greatest at the intermediate positions of the handle; but the speed of movement of the juicer head decreases as it finally approaches the juicer cone 47; and in the position of Fig. 3 the handle exerts maximum force, while producing a minimum amount of movement.

Whereas the pinion and rack juicers of the prior art required a twirling of the pinion shaft to elevate the juicer head sufficiently, the present mechanism requires a motion of only two hundred and seventy degrees to lift the juicer head to its maximum elevation. Furthermore, the present mechanism slows up the juicer head's movement as it comes close to the juicer cone, and enables the user to exert a maximum force on the juicer at this point.

The juicer head rising draws with it the stop rod 66. The pressure cup tends to retain the rind of the citrus fruit. When the laterally turned end 67 of the stop rod 66 engages the stop surface 69, the head continues to move, but the rod 66 pulls the lever 78 downward counterclockwise in Fig. 4, pivoting on that end which is in the socket 76. The lever 78 then snaps the ejector 91 downward, and the flat end of the ejector engages the citrus fruit rind and ejects it downward from the presure cup 58.

At this time the operator should have his left hand holding a new half orange or lemon above the cone 47 and below the rind which is being ejected from the cone 58. The ejected rind will strike the top of the hand of the user; and as the user moves his hand out from under the pressure cup 58 the rind will be deflected from the juicer and deposited in a suitable container. The direction of its movement can be controlled by turning the handle at this time.

Referring to Figs. 8 to 10 and 12, these are views which show a modified mechanism in which the rack 60 is replaced by a plunger 121. Plunger 121 has a sliding movement in a complementary guide 122; and the plunger is pivotally connected at its lower end to a link 123, which is pivotally connected to the end of a crank 124.

The crank 124 is fixedly secured to a shaft 125, which, like the shaft 106, may carry the same handle 22. All of the other parts of the mechanism may be similar, except that the column has a forwardly extending arm 126 with a threaded bore 127 for receiving the threaded shank 128 on the juice collector 129. This gives the juice collector a vertical adjustment suitable for taking care of thick or thin rind citrus fruits.

Figure 10:
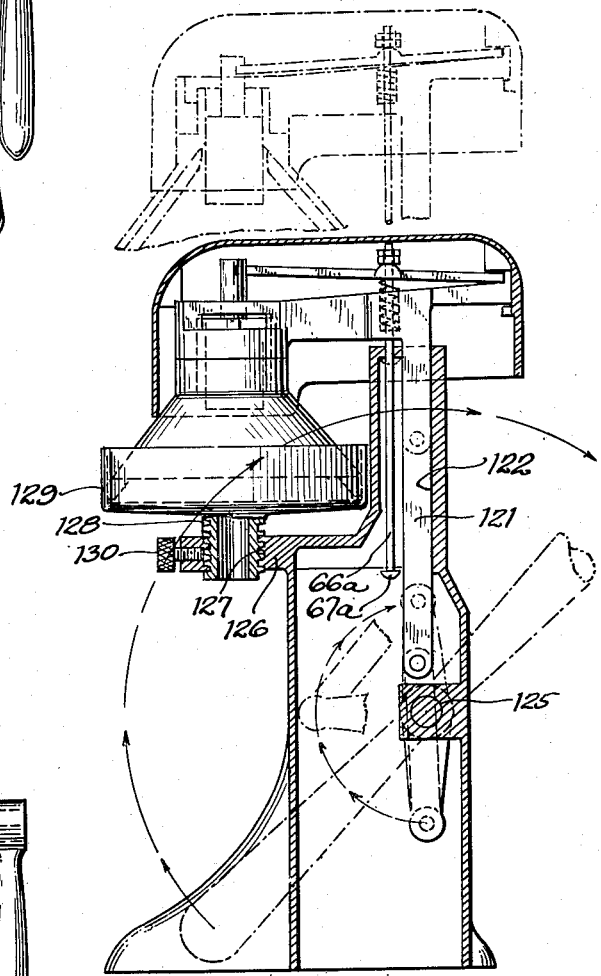
Fig. 10 is a sectional view, taken on the plane of the line 10—10 of Fig. 9, looking in the direction of the arrows, with a second position of the parts shown in dotted lines.
Figure 12:
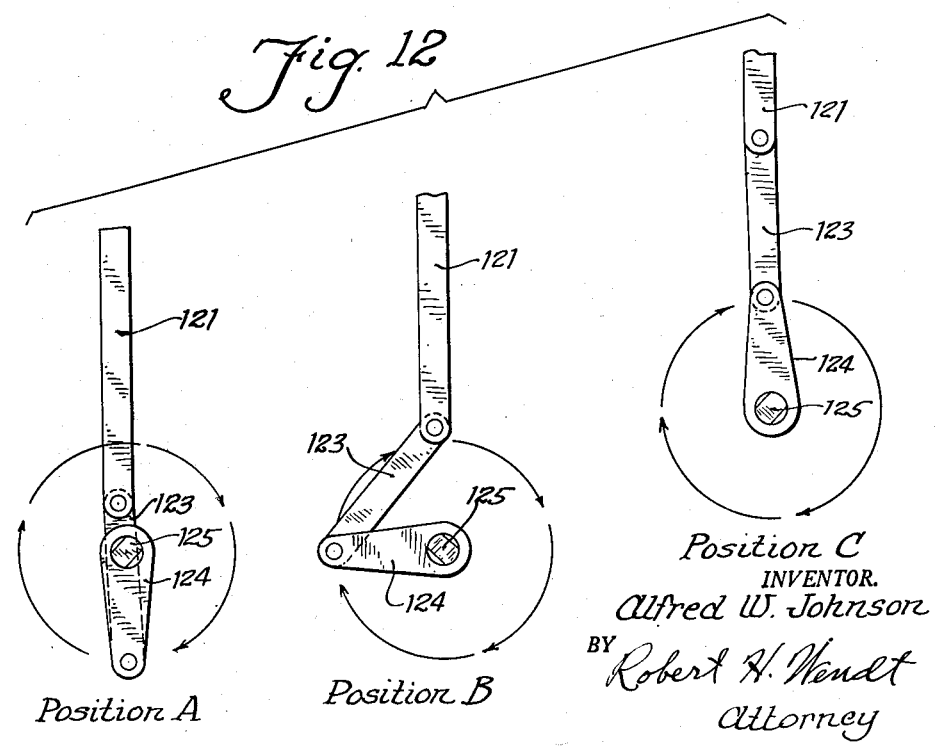
Fig. 12 is a series of fragmentary views showing the actuating mechanism of Fig. 10 in different positions.

The adjustment is rendered desirable by the fact that the link mechanism of Fig. 12 and Fig. 10 has a definite amount of travel; but the pressure cup and cone can be brought together as closely as desired by adjusting the elevation of the juice collector 129 and securing it by means of a set screw 130.

In this embodiment the rod 66a is provided with a head 67a, which acts just like the other stop rod to control the ejector.

The operation of the modification of Figs. 10 and 12 is as follows:

In position A the mechanism is in the position which it assumes when the pressure cup has reached the limit of its downward movement. Position C is the position which it assumes when it has reached the limit of its upward movement. As the mechanism leaves or approaches either of these positions the actuating lever is capable of exerting a maximum force with a minimum movement of the pressure cup; and this is of particular importance in position A. As the mechanism approaches this position the operator can place a very heavy force on the pressure cup to squeeze out all of the juice with a minimum amount of effort.

As the mechanism approaches position B from position A the amount of force exerted diminishes; but the speed of operation increases; and in position B the actuating lever moves the pressure cup more quickly, but with less leverage. It is, therefore, evident that the present mechanism is adapted to bring the parts into operative position more quickly than the devices of the prior art; and thereafter to exert a greater force.

From another point of view, the reason why greater power can be exerted as the pressure cup approaches the cone to squeeze the fruit is that in this position the handle has a longer effective lever arm and a greater leverage.

Figure 15:
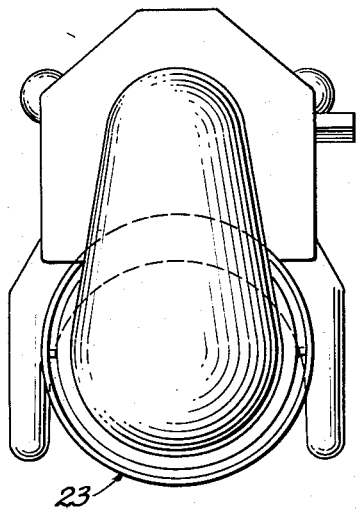
Fig. 15 is a top plan view of the same.
Figure 13:
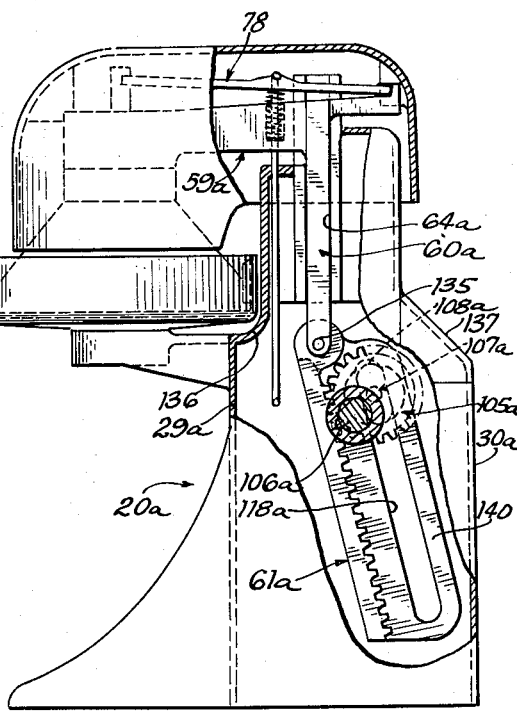
Fig. 13 is a view, similar to Fig. 10, of another modification, in which the rack is mounted for pivotal movement so that the shaft need not have a slot for lateral movement.
Figure 14:
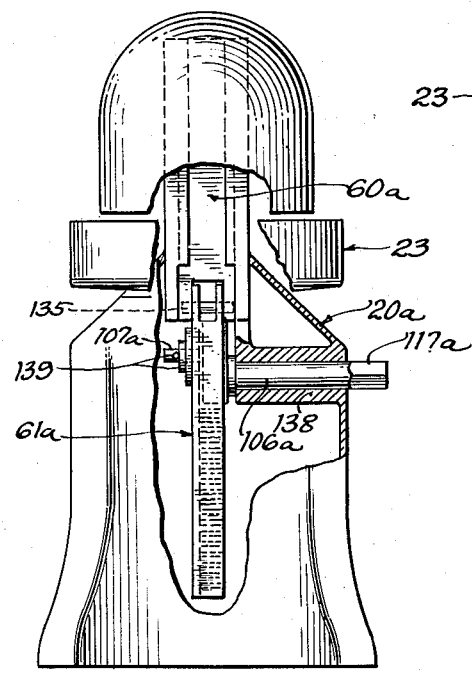
Fig. 14 is a fragmentary front elevational view of this modification.

Referring to Figs. 13 to 15, these are views of another modification, in which all of the parts are the same, except the actuating mechanism. In this case the actuating mechanism includes a rack 61a of particular construction, which is pivotally connected to a vertically extending plunger 60a that forms a part of the cross head 59a. The point of pivotal connection is indicated at 135.

In this case the plunger 60a is slidably mounted in guides 64a and is adapted to actuate the pressure cup and the ejector in exactly the same way as in the previous embodiments. Therefore, similar numerals have been applied to similar parts.

The base 20a, however, differs from those previously used in that more clearance must be provided inside the housing for movement of the rack 61a; and therefore the base has a forward offset at 136 under the juice collection cup 23, producing a greater spread between the front and rear walls 29a and 30a. The rear wall 30a is also farther back as a result of a rear offset 137 in the base to permit the necessary pivotal movement of the rack 61a.

In this case the base 20a carries an integral bearing 138 for the shaft 106a, which carries the same handle at its outer end 117a. The shaft 106a carries an integral pinion 105a, which meshes with the rack 61a. The pinion 105a, however, is eccentrically mounted upon the shaft 106a and carries a laterally projecting stub shaft 107a, which is concentric on the pinion and has an oval slider 108a that is slidably mounted in the elongated slot 118a of the rack 61a.

The stub shaft 107a carries a washer and cotter pin 139 holding the slider 108a in its slot 118a. The rack in this case includes a toothed portion or body and a laterally projecting flange 140 which bears the slot 118a in which the stub shaft 107a and its slider 108a slide.

The operation of this modification, from the point of view of its function in removing juice, is substantially the same as those previously described. The handle moves the pressure cup quickly when it is away from the cone; but moves the pressure cup slowly when it is close to the cone, so that the handle has a maximum power for exerting pressure on the fruit.

The operation of the specific mechanism is as follows: The parts are shown in the position, in Fig. 13, which they assume when maximum pressure is being applied to the fruit in the juicer. At this time the handle may be substantially horizontal, or pointing forwardly and downwardly. When the handle is in this position, the distance from the center of stub shaft 107a to the center of shaft 106a is added to the leverage of the handle.

As the handle is lifted, the pinion rotates upon shaft 107a as a center, and eccentrically upon the shaft 106a, which has its bearing at a fixed elevation. The rack then rises; and the slot 118a rises on the slider 108a. Approximately 180 degrees of movement of the handle will raise the pressure cup sufficiently to remove the hulls and insert new fruit; and while this is done, the rack also pivots upon the pivot 135, as required by the eccentricity of the pinion. The pinion is kept in engagement with the rack by the stub shaft 107a and its slider 108a, in parallel slot 118a.

All of the modifications shown are so arranged that the handle exerts a maximum force on the pressure cup at the end of its forward and downward range of motion; but as soon as the pressure cup is moved away from the cone, the handle is adapted to move with minimum force and maximum speed.

It also moves the parts out of the squeezing position more quickly; and thus the operating time is diminished and the time of the operator is saved.

The ejector in this form of mechanism acts in the same way as the one previously described; but the juice collecting bowl is adjustable as to its elevation for thin rinds or thick rinds.

It will thus be observed that I have invented an improved fruit juicer, which involves a new operating technique, with a handle movement of about one hundred and eighty degrees, that moves the parts quickly into position, and thereafter moves more slowly for the same handle movement, but exerts a maximum force.

The present mechanism is also so arranged that the feed of fruit to be juiced is simple and coordinated with the operations of ejection, so that many more oranges or lemons can be juiced in the same period of time by the present mechanism than the devices of the prior art.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a fruit juicer, the combination of a support having a stable base with a fruit holder carried thereby, a complementary pressure cup for engaging the fruit and pressing it against said holder, said cup being carried by a reciprocating member on said support, actuating mechanism for said reciprocating member, said pressure cup including means carried thereby for gripping and supporting the rind of the fruit to lift the rind from said holder, an ejector slidably mounted in said pressure cup, and means for actuating said ejector to eject the rind, said means including a lever mounted on said reciprocating member and movable therewith, said lever having one end engaged with said ejector and its opposite end in pivotal engagement with said support, and a rod operated by said actuating mechanism and pivoted to said lever intermediate its ends for moving said lever to operate said ejector.

2. In a fruit juicer, the combination of a support having a stable base with a fruit holder carried thereby, the base having an upwardly extending hollow column, a complementary pressure cup for engaging the fruit and pressing it against said holder, said cup being carried by a reciprocating member mounted in said hollow column, actuating mechanism for said reciprocating member, said pressure cup including means carried thereby for gripping and supporting the rind of the fruit to lift the rind from said holder, and ejector slidably mounted in said pressure cup, and means for actuating said ejector to eject the rind, said means including a lever mounted on said reciprocating member and movable therewith, said lever having one end engaged with said ejector and its opposite end in pivotal engagement with said support, and a rod slidably mounted in said hollow column operated by said actuating mechanism and pivoted to said lever intermediate its ends for moving said lever to operate said ejector.

3. In a fruit juicer, the combination as set forth in claim 1 further including a spring interposed between said reciprocating member and said lever to urge at least a portion of said lever away from said reciprocating member.

4. In a fruit juicer the combination as set forth in claim 1 wherein said rod extends through a bore in said reciprocating member and extends through a bore in said lever, and wherein a coil spring surrounds a portion of said rod and is positioned between said reciprocating member and said lever for resiliently urging at least a portion of said lever away from said reciprocating member.

ALFRED W. JOHNSON.

REFERENCES CITED

The following references are of record in the file of this patent:

UNITED STATES PATENTS

| Number | Name | Date |
| --- | --- | --- |
| 599,856 | Middlekauff | Mar. 1, 1898 |
| 1,196,159 | Schmitt | Aug. 29, 1916 |
| 1,228,578 | Marston | June 5, 1917 |
| 1,264,080 | Jennings | Apr. 23, 1918 |
| 1,958,570 | Flegel | May 15, 1934 |
| 2,131,440 | Johnson | Sept. 27, 1938 |
| 2,177,939 | Johnson | Oct. 31, 1939 |
| 2,200,032 | Lovelace | May 7, 1940 |
| 2,367,859 | Fromm | Jan. 23, 1945 |
| 2,474,399 | Johnson | June 28, 1949 |
| 2,531,026 | Cadella | Nov. 21, 1950 |